(12) United States Patent
Frederick et al.

(10) Patent No.: US 11,380,205 B2
(45) Date of Patent: *Jul. 5, 2022

(54) PROXIMITY DETECTION SYSTEM AND METHOD AND COLLISION AVOIDANCE SYSTEM AND METHOD USING PROXIMITY DETECTION

(71) Applicant: Strata Safety Products, LLC, Sandy Springs, GA (US)

(72) Inventors: Larry D. Frederick, Huntsville, AL (US); Paul L. Hammond, Huntsville, AL (US)

(73) Assignee: Strata Safety Products, LLC, Sandy Springs, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/993,806

(22) Filed: Aug. 14, 2020

(65) Prior Publication Data

US 2020/0372801 A1 Nov. 26, 2020

Related U.S. Application Data

(63) Continuation of application No. 16/595,869, filed on Oct. 8, 2019, now Pat. No. 10,769,955, which is a
(Continued)

(51) Int. Cl.
*G08G 1/16* (2006.01)
*G08B 21/02* (2006.01)
(Continued)

(52) U.S. Cl.
CPC ............. *G08G 1/166* (2013.01); *B60Q 9/008* (2013.01); *F16P 3/14* (2013.01); *F16P 3/145* (2013.01);
(Continued)

(58) Field of Classification Search
CPC ... B60Q 9/008; F16P 3/14; F16P 3/145; F16P 3/147; G08B 21/0213; G08B 21/0275; G08B 3/10; G08G 1/166
See application file for complete search history.

(56) References Cited

U.S. PATENT DOCUMENTS 2,957,115 A 10/1960 Clark et al.
3,064,257 A 11/1962 Guest
(Continued)

FOREIGN PATENT DOCUMENTS

CN 101073099 A 11/2007
WO WO-2004/090830 A1 10/2004
(Continued)

OTHER PUBLICATIONS

DM Kisch Inc., South African Search Report, Sep. 26, 2008.
(Continued)

*Primary Examiner* — Sisay Yacob
(74) *Attorney, Agent, or Firm* — Blank Rome LLP

(57) ABSTRACT

The invention relates to a complex proximity safety and warning system. The invention provides a safety system comprising a generator that generates a magnetic field that establishes a boundary, where the generator is capable of receiving radio frequency signals. Also provided is a radio frequency device that sends radio frequency signals, the radio frequency device being capable of sensing the magnetic field and generating a radio frequency response.

26 Claims, 10 Drawing Sheets

Related U.S. Application Data continuation of application No. 16/233,690, filed on Dec. 27, 2018, now Pat. No. 10,467,902, which is a continuation of application No. 15/878,707, filed on Jan. 24, 2018, now Pat. No. 10,170,000, which is a continuation of application No. 15/288,507, filed on Oct. 7, 2016, now Pat. No. 9,898,930, which is a continuation of application No. 14/479,172, filed on Sep. 5, 2014, now Pat. No. 9,466,216, which is a continuation of application No. 13/538,156, filed on Jun. 29, 2012, now Pat. No. 8,847,780, which is a continuation of application No. 11/984,824, filed on Nov. 21, 2007, now Pat. No. 8,232,888.

(60) Provisional application No. 60/996,034, filed on Oct. 25, 2007.

(51) Int. Cl.
  *F16P 3/14* (2006.01)
  *G08B 3/10* (2006.01)
  *B60Q 9/00* (2006.01)

(52) U.S. Cl.
  CPC ............... *F16P 3/147* (2013.01); *G08B 3/10* (2013.01); *G08B 21/0213* (2013.01); *G08B 21/0275* (2013.01)

(56) References Cited

U.S. PATENT DOCUMENTS

| | | | |
|---|---|---|---|
| 4,818,855 A | 4/1989 | Mongeon et al. | |
| 4,965,909 A | 10/1990 | McCullough et al. | |
| 5,025,175 A | 6/1991 | Dubois, III | |
| 5,315,289 A | 5/1994 | Fuller et al. | |
| 5,477,210 A | 12/1995 | Belcher | |
| 5,767,669 A * | 6/1998 | Hansen | G01B 7/004 324/225 |
| 5,787,841 A | 8/1998 | Titus et al. | |
| 5,892,447 A | 4/1999 | Wilkinson | |
| 5,939,986 A | 8/1999 | Schiffbauer et al. | |
| 5,942,975 A | 8/1999 | Sorensen | |
| 6,150,956 A | 11/2000 | Laufer | |
| 6,346,890 B1 | 2/2002 | Belin | |
| 6,614,387 B1 | 9/2003 | Deadman | |
| 6,686,881 B1 * | 2/2004 | Lu | G01S 5/0036 342/458 |
| 6,724,191 B1 | 4/2004 | Larsen | |
| 6,784,800 B2 | 8/2004 | Orzechowski | |
| 6,963,278 B2 * | 11/2005 | Frame | B66C 15/045 340/539.22 |
| 7,095,336 B2 | 8/2006 | Rodgers et al. | |
| 7,339,478 B2 | 3/2008 | Le | |
| 7,420,471 B2 | 9/2008 | Frederick et al. | |
| 7,890,235 B2 * | 2/2011 | Self | G01S 19/13 340/539.22 |
| 2002/0082803 A1 | 6/2002 | Schiffbauer | |
| 2003/0020645 A1 * | 1/2003 | Akiyama | G08C 23/04 340/13.24 |
| 2003/0137421 A1 | 7/2003 | Herkenrath et al. | |
| 2003/0151508 A1 * | 8/2003 | Frame | B66C 15/045 340/8.1 |
| 2003/0227268 A1 | 12/2003 | Smith | |
| 2004/0113774 A1 | 6/2004 | Wilson | |
| 2004/0155809 A1 * | 8/2004 | Eyer | G08C 23/04 341/176 |
| 2005/0122218 A1 * | 6/2005 | Goggin | G01S 7/4813 340/552 |
| 2006/0087443 A1 * | 4/2006 | Frederick | F16P 3/145 340/573.4 |
| 2006/0145883 A1 | 7/2006 | Fong et al. | |
| 2006/0180094 A1 * | 8/2006 | Viggiano | A01K 15/023 119/721 |
| 2006/0271263 A1 * | 11/2006 | Self | G05D 1/0033 701/2 |
| 2007/0001803 A1 | 1/2007 | Plamoottil | |
| 2007/0120698 A1 | 5/2007 | Turk et al. | |
| 2007/0296565 A1 | 12/2007 | Himmel | |
| 2010/0280662 A1 * | 11/2010 | Abdallah | H01R 13/17 700/261 |
| 2010/0289662 A1 | 11/2010 | Dasilva | |

FOREIGN PATENT DOCUMENTS

| | | |
|---|---|---|
| ZA | 89/3125 | 12/1989 |
| ZA | 98/11447 | 7/1999 |
| ZA | 98/4073 | 11/1999 |
| ZA | 98/11449 | 6/2000 |
| ZA | 2000/4689 | 5/2001 |
| ZA | 2000/5675 | 7/2001 |
| ZA | 2006/03514 | 2/2005 |
| ZA | 2005/08120 | 1/2007 |

OTHER PUBLICATIONS

International Search Report and Written Opinion dated Jul. 2, 2010, issued in related International Appln. No. PCT/US2010/032914.

* cited by examiner

PROXIMITY DETECTION SYSTEM AND METHOD AND COLLISION AVOIDANCE SYSTEM AND METHOD USING PROXIMITY DETECTION

CROSS-REFERENCE TO RELATED APPLICATIONS

This application is a continuation of U.S. application Ser. No. 16/595,869, filed Oct. 8, 2019, which is a continuation of U.S. application Ser. No. 16/233,690, filed Dec. 27, 2018, which is a continuation of U.S. application Ser. No. 15/878,707, filed Jan. 24, 2018, now U.S. Pat. No. 10,170,000, which is a continuation of U.S. application Ser. No. 15/288,507, filed Oct. 7, 2016, now U.S. Pat. No. 9,898,930, which is a continuation of U.S. application Ser. No. 14/479,172, filed Sep. 5, 2014, now U.S. Pat. No. 9,466,216, which is a continuation of U.S. application Ser. No. 13/538,156, filed Jun. 29, 2012, now U.S. Pat. No. 8,847,780, which is a continuation of U.S. application Ser. No. 11/984,824, filed Nov. 21, 2007, now U.S. Pat. No. 8,232,888, which claims the benefit of U.S. Provisional Application No. 60/996,034, filed on Oct. 25, 2007, the subject matters of each of which is incorporated in their entirety by reference herein.

BACKGROUND

The present invention relates generally to safety systems at work sites, and in particular to an interactive magnetic marker field and proximity warning system. Many methods have been devised to protect people from being struck, pinched, crushed or otherwise harmed by vehicles and mobile equipment. Such vehicles and mobile equipment may be used for above and below ground operations. Examples of the equipment include: road construction equipment such as trucks, road graders, rollers and pavers; surface mining equipment, such as for use with gravel and sand operations, front end loaders, trucks, dozers, conveyors and other items; underground mining equipment such as continuous miners, shuttle cars, conveyors, crushers, load-haul-dump vehicles, man-trips, tractors, and other items. The equipment also includes fork lifts, cranes, and trucks used at warehouses and shipping ports.

Hundreds of people are killed each year in the US by such equipment. Unfortunately, the systems that have been devised to protect people and property in these industrial operations, such as proximity protection and collision avoidance systems have usually not been very effective. A new proximity protection system, sometimes referred to as a collision avoidance system, was developed and successfully demonstrated for use on continuous miners, as disclosed in U.S. Patent Application Publication 2006/0087443, which is incorporated in its entirety by reference herein. An objective of the '443 publication was to prevent the crushing or pinning of personnel who are remotely controlling a continuous miner, and to protect other personnel assisting in use of the continuous miners. The '443 publication also envisioned to provide protection to personnel from other types of mobile equipment and machines. The system of the '443 publication employs a magnetic marker field and an active architecture that incorporates two-way communication between the person being protected and the machine from which the person is being protected. Warnings are given to workers that are dangerously close to the miner. Warnings are also provided to the operator of the machine. Provisions are made to immobilize the equipment until personnel were able to reach a safe position.

The '443 publication, however, did not provide an architecture that was fully adequate for environments where there are many personnel working in close proximity to multiple equipment in the same workspace. For example, it is essential that a signal or response by the system be directed only to the machine, and/or the machine's operator, that is threatening a worker's safety. Otherwise, a signal or response from the system will result in unnecessary signals or responses to other, unaffected machines and/or workers. Such unnecessary signals and responses result in unwanted false alarms. False alarms and nuisance alarms have been known for years to be a major reason why many proximity protection systems and collision avoidance systems have failed when in real operational environments.

False alarms or nuisance alarms have traditionally been the primary reason for failure of deployed proximity systems. In real industrial environments, proximity systems have experienced many forms of errors as well as problems related to the shape of the protection zones. Such errors and problems are discussed in the NIOSH Report RI 9672, titled "Recommendations for Evaluating & Implementing Proximity Warning Systems on Surface Mining Equipment," of the Department of Health and Human Services.

An example of what happens when alarms are sounded without there being a real danger can be explained with respect to standard backup alarms required by law for most industrial vehicles. When the vehicle or machine begins to back up, a horn is typically sounded. In a work environment where there are many vehicles or machines, there typically are many horns sounding very frequently. Such horns are soon ignored by the workers. This is because it is not realistic for each worker to stop to consider every horn sounding within their work area. Even when there is only one vehicle, if that vehicle is frequently backing up and the workers frequently hear the horn sound while knowing that their safety is not being threatened, the workers will soon begin to ignore the warning horn or alarm. Then, when their safety actually is threatened, the horn provides no protection because the workers would disregard the horn, believing it to be just another false alarm. Thus, the worker should be warned only when there is a threat to them.

Previous proximity and collision avoidance systems have not been effective in reliably warning only of real threats to safety, while also avoiding giving alarms when there is no real danger to the worker. Analysis of prior art collision warning systems are discussed in a publication from SAE International, titled "Development and Testing of a Tag-based Backup Warning System for Construction Equipment," No. 2007-01-4233. The shortcomings have been found to exist for work sites where only one machine and a worker are operating. The shortcomings are magnified in complex work areas, areas involving many elements. Another proximity protection concept has been under development for use at work sites, such as road construction sites, surface mining, loading docks, etc., where multiple machines and vehicles routinely work in close conjunction with each other, and where many workers work within the area around the machines. Based upon tests, a need has been identified for restricting the defined hazard zones such that workers can approach a vehicle at the side or front without producing alarms.

Another challenge for safety systems is that the operators of vehicles and equipment may frequently dismount and/or leave the equipment that they are operating. Existing proximity protection safety systems do not distinguish between situations when the operator is riding in his vehicle or machine—situations where the system should not produce a warning or take an action to immobilize the vehicle—and situations where the operator dismounts and moves around the vehicle, when full protection for the operator is needed.

Given the rapid growth of radio frequency identification (RFID) technologies worldwide, consideration has been given to using RFID technologies and schemes for proximity protection. A major drawback with using RFID technologies is that this approach depends upon radio frequency (RF) transmissions at high frequencies in the electromagnetic spectrum. Since the maximum range of some types of RF systems is almost unlimited, up to miles, if needed, it might seem to be a good candidate, for that reason, for collision avoidance systems, particularly when the vehicles are traveling at higher speeds. Also, the higher frequencies can provide much greater bandwidth, which allows implementation of many special functional features. In complex work environments, however, there are many metallic materials and surfaces that reflect the RF signals, causing the RF signals to travel over multiple paths. If the RF receivers are used to measure the strength of RF signal, in order to determine the distance between the vehicle and the person to be protected, these reflections over multiple paths can cause errors in the measurements. Radar systems are prone to identify most any objects within the defined hazard zones, even though the objects are no threat to safety. GPS signals have also been found to be affected by reflections of nearby equipment, causing a mis-calculation of the distance between the receivers and the vehicles. As a consequence, a reliable marker field (for a safety zone, for example) can not be maintained with high frequency RF systems. In addition, RF signals do not easily pass through earth formations; as such, personnel may be shielded from the safety system until it is too late to take evasive actions. Even medium frequency magnetic fields have been found to propagate on cables and pipes, making medium frequency magnetic fields less reliable than desired.

In contrast to RF fields, magnetic fields, oscillating at low frequencies, are known to be stable and can be effectively used to mark off safety zones or danger zones. Such technologies are discussed in U.S. Pat. Nos. 6,810,353 and 5,939,986 to Schiffbauer, which are incorporated by reference herein. Although the maximum practical range of such low frequency magnetic fields may be less than 50 feet in most applications, that is more than is needed or desirable for most equipments. Typical haul trucks would probably be best served with a warning zone in the range of 20-30 feet and a danger zone in the range of 10-15 feet. In some applications, such as remotely controlled continuous miners, it is necessary for the operator to remain within a range of 10-25 feet much of the time in order to maintain good visual contact with the machine and the immediate surroundings. In underground mines, the magnetic fields pass through earth formations unimpeded so that a worker that is around a corner, not in line of sight, or otherwise obstructed, will still be visible to the marker field. These magnetic fields do not radiate from antennas but simply expand and contract around the element that produces them, and are well suited for marking boundaries between safe zones and unsafe zones. An attempt has been made to apply identification information (IDs) to magnetic fields as part of proximity protection or collision avoidance strategy. There are serious limitations to this approach, however, particularly where there are numerous elements (machines, workers, etc.) involved at a work site. At low frequencies bandwidth is limited, thus limiting the processes that would typically be employed. If two adjacent machines are transmitting their IDs at the same time, the low frequency fields may conflict, causing the amplitude of the composite field to vary, causing errors in the data set. With low frequency markers fields, the bandwidth available is not sufficient to allow rapidly re-sending data sets and use algorithms to remove the errors. There are numerous possible interactions between many elements, the circumstances of which may sometimes be ignored, but may also be critical to safety.

Conflicts between the fields produced by the multiple systems easily occur. Workers may find themselves within the magnetic fields of more than one machine and coordination of the system responses can be degraded and unreliable. For example, if a Personal Alarm Device, used to personally warn a worker of a safety threat, is in two hazard zones, of two machines, and one is a greater threat, the Personal Alarm Device must be able to determine which is the greatest threat and respond accordingly. At the same time, the operator of a machine needs to be given the appropriate alarm for that machine, not the alarm that is appropriate for the second machine. When there are three or four machines that are in the same area, working closely together, it is critical that the workers around each and the operator of each do not receive confusing indications. If the alarms are confusing, the safety system will not be used. What is needed is a proximity system that can reliably accommodate an environment having multiple moving elements.

There is also a need for a way to transmit information from each worker to log events, such as safety-related event, that are experienced, to allow use of the system to track personnel during an emergency, for example. There is also a need to provide a means to collect data related to the location and safety of an individual worker. In addition, there is a need for workers to be able to provide interactive responses to equipment and/or operators.

Moreover, although low frequency fields are ideal for marking off protection zones or danger zones because they are very stable, this stability in field shape is a disadvantage in some cases. For example, there are situations where it is desirable for workers to be close to equipment at one location but not close at another location. An example is a truck that is backing up. A worker at the side of the truck is at a very low risk or possibly no risk at all; yet, a worker behind the truck may be at a very high risk. Magnetic fields that extend far enough behind the truck to provide the needed protection, however, will also produce a larger than desired field to the sides of the truck. There is also a need, therefore, to be able to shape a marker field to exclude areas where workers need to be positioned, and/or areas that present no safety risk, for example. Moreover, what is needed is a special system design and architecture for a reliable proximity warning or collision avoidance system that will avert the many hazards that exist in the many, diverse industrial work environments.

SUMMARY

Work environments to which this invention is applicable are very diverse. Space in this document does not allow describing all these applications. One of these environments, a road construction environment may be used as a basis for describing important and novel features of the invention. Some workers at a road construction site may be, for a time, working around a particular machine and then move to a different machine or continue to work when another machine arrives. Some workers may frequently move through a space between machines. Yet others may be riding upon a vehicle but may also switch from operating one vehicle to another vehicle. And, some machines may be remotely controlled by the workers. A robust proximity protection system must consider and be able to reliably keep workers safe while coping with all such operational variables, and do so without significant false alarms or warnings. The invention satisfies these requirements.

Complex work environments pose major challenges to a proximity protection system when it is required to protect all the moving equipment and personnel from collisions. When there are multiple workers in an area, it is essential that the system's response to one worker does not interfere with, disrupt, or confuse the system's actions toward other workers. Therefore, it is important that a warning or alarm be directed only to the worker who requires such an alarm, but not to other workers. This way, an operator or associated worker will know that when they receive an alarm, the alarm is specifically intended to alert them to take some action, either to avert or evade a hazard.

In one embodiment, the invention provides a safety system comprising a generator that generates a magnetic field that establishes a boundary, where the generator is capable of receiving radio frequency signals. Also provided is a radio frequency device that sends radio frequency signals, the radio frequency device being capable of sensing the magnetic field and generating a radio frequency response. In the safety system, the generator generates the magnetic field for a first predefined time period, and thereafter senses for a radio frequency response signal from the radio frequency device within a second predefined time period.

In another embodiment, the invention provides a safety system for generating a shaped safety boundary. The safety system comprises a first generator that generates a first magnetic field having a first boundary, and a second generator that generates a second magnetic field having a second boundary. According to the invention, overlaying the first and second boundaries produces a different boundary, and the first and second magnetic fields are generated in sequence.

In yet another embodiment, the invention provides a magnetic field generator for a safety system, comprising a magnetic field generator controller for producing a timed pulse of oscillations, and an amplifier for amplifying the timed pulse of oscillations. The generator also has a winding and a ferrite, wherein the timed pulse of amplified oscillations produces a current through the winding and ferrite, thereby creating a magnetic field having a strength. According to the invention, the strength of the magnetic field is variable by adjusting the width of the timed pulse.

BRIEF DESCRIPTION OF THE DRAWINGS

The above and other advantages and features of the invention will be more clearly understood from the following detailed description which is provided in connection with the accompanying drawings.

DETAILED DESCRIPTION OF PREFERRED EMBODIMENTS

The invention is particularly applicable to work sites that require personnel to be in close proximity to various hazardous elements, such as machines, mobile equipment, remotely controlled machines, and operated vehicles. Such work environments may include locations that are inherently dangerous and should be avoided or entered only with great caution. Examples of such work environments are surface mining, underground mining, sand and gravel operations, road construction, warehouses, shipping docks, coke plants, etc. Workers are sometimes struck, pinched, crushed or otherwise harmed while performing their jobs in such environments. Collisions between the various elements at the work sites need to be avoided also to avert property damage.

The invention overcomes the limitations in the prior art by use of a novel method, and apparatus for practicing the method, for generating and coordinating magnetic marker fields, and for responding to the magnetic marker fields via RF transmissions. Special functions are also provided by the safety system of the invention, functions that make the safety system more reliable, more user friendly, more versatile and able to utilize the inherent system capability to provide other benefits.

As disclosed herein, various protection zones can be shaped to fit specific equipment or work area configurations. Thus, it is possible to produce safety zones having desired shapes. In addition, an important aspect of the invention is a method and an apparatus operated to pulse magnetic marker fields, each pulse being composed of low frequency oscillations. The pulse is referred to herein as a PING. The apparatus is also operated to pulse RF transmissions, referred to herein as an ECHO, in response to the PING. A typical pulse of the magnetic field (PING) would be to produce 73 oscillations of the field, over a period of 1 millisecond, for example. Typical pulse of the RF response (ECHO) would be to produce 229,000 cycles over a period of 250 microseconds, for example.

The invention is robust, providing a very reliable warning system. In addition to the necessity of providing alarms or taking action when there is danger, the safety system of the invention does not produce false alarms when there is no danger. Most previous systems have made little or no progress in providing meaningful protection to multiple people from multiple machines in the same confined general area. The PING/ECHO system described herein reliably provides warnings with almost no errors in real industrial environments, involving complex equipment and personnel arrangements.

Figure 1:
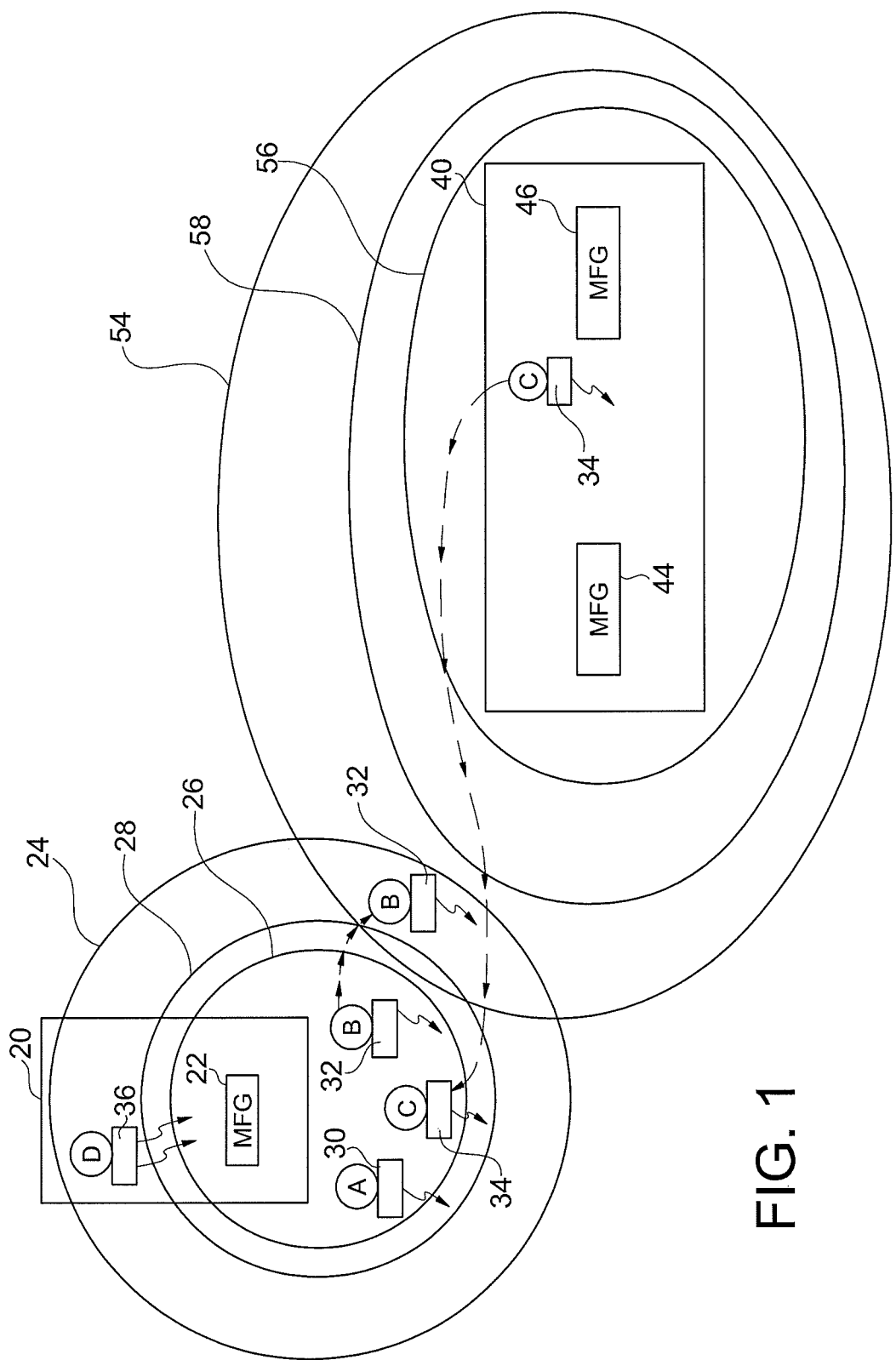
FIG. 1 shows an exemplary worksite having a safety system in accordance with an embodiment of the invention.

Referring now to FIG. 1, there is illustrated a simplified example of a work site where an embodiment of the invention is implemented. FIG. 1 shows two vehicles 20, 40, and three Marker Field Generators (MFGs) 22, 44, 46. FIG. 1 also shows three personal alarm devices (PADs) 30, 32, 34, that are carried by workers A, B, C. FIG. 1 also shows worker D, carrying PAD 36, who is a operating or driving the vehicle 20.

The MFGs and PADs are essential elements of a PING/ECHO system and are described in greater detail with reference to FIG. 2. An MFG 80 is shown having a microcontroller 82, which produces low frequency oscillations that are amplified by the amplifier 84. The low frequency oscillations produce a low frequency oscillating current through a winding 86 around the ferrite 90. A capacitor assembly 88 is connected in series with the winding 86 to produce the oscillating magnetic field. The values of capacitor(s) in the capacitor assembly 88 are selected to produce a series resonant circuit at the operating frequency of the PING/ECHO system. A typical circuit would include an inductance value of approximately 300 microHenry with a capacitance of approximately 163 microfarad, for example. The invention's use of a series resonant circuit produces a higher current through the winding 86 with less driving voltage.

A magnetic marker field 92 is then produced around the magnetic marker field generator 80. The magnetic marker field 92 expands and collapses at the selected operating frequency. An operation frequency of approximately 73 kHz has been found to be a suitable choice, for example. Having knowledge of the teachings disclosed herein, persons knowledgeable in magnetics, tuned circuits and the intended applications can select the operating frequency and the circuit elements to fit the specific applications. For example, the operating frequency might be reduced to 25 kHz if the L/C ratio and the voltage used to drive the LC circuit do not result in a rise time greater than desired for the system response that is required. Higher frequencies above about 100 kHz should be avoided in underground mining since they tend to propagate on cables and pipes, or via other metallic objects.

Figure 2:
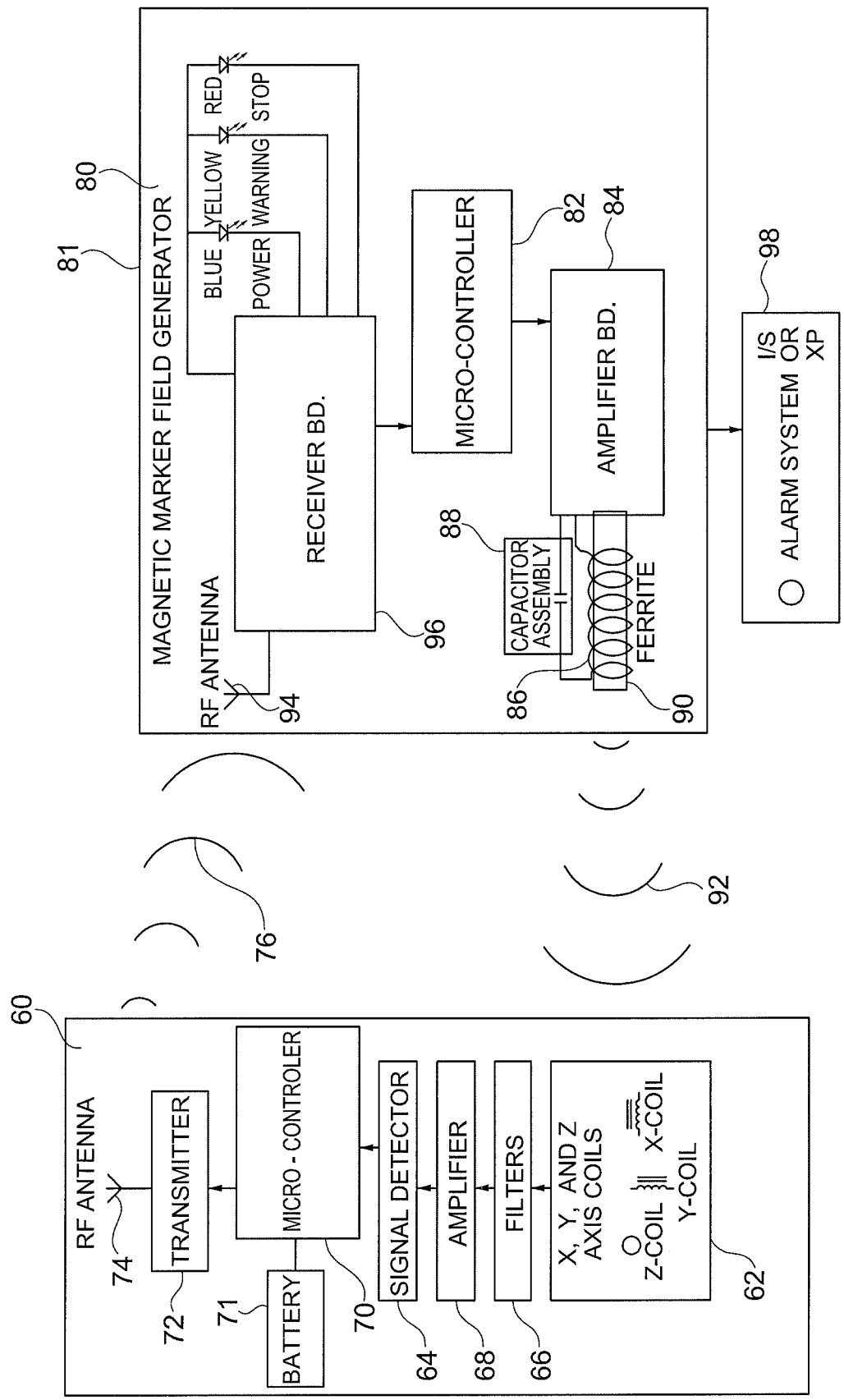
FIG. 2 show schematics of a marker field generator and a personal alarm device in accordance with an embodiment of the invention.

Also shown in FIG. 2 is personal alarm device (PAD) 60. The PAD 60 has three orthogonal coils 62 that sense the marker field 92, and in turn pass the sensed signal/information into a detection circuit 64, via filters 66 and amplifier 68. A microcontroller 70 measures the strength of the signals, and has a battery 71. The microcontroller 70 turns on the RF transmitter 72 to send, through antenna 74, a return signal 76 (an ECHO) to the receiver antenna 94 in the generator 80. The ECHO signal 76 then passes to the MFG receiver 96, which registers the presence of an ECHO and sends an appropriate response/information to the microcontroller 82.

In use, the MFG microcontroller 82 determines whether the ECHO 76 has been received in response to the PING 92 sent by the MFG 80. The MFG microcontroller 82 also determines the safety zone in which the ECHO-emitting PAD is located. Alarm signals are sent to an alarm system 98 located near the vehicle operator and/or on the vehicle. The alarm signals are audible and/or visible to the affected worker(s). The housing 81 of the MFG 80 shown for this configuration may to be an explosion-proof type, so that it may be used in underground coal mining or other applications where there may be an explosive environment. Other details regarding MFGs and PADs, including for example how housings may be constructed, are disclosed in the '443 publication, and incorporated by reference herein.

Referring again to the work site shown in FIG. 1, there are numerous possible cooperative and potentially destructive relationships between system elements, even for this simple example. With more elements, the number of possible relationships increases rapidly. A real operational environment often includes many MFGs and many more PADs. For example, with four vehicles or machines, four operators, and four other workers, there are hundreds of relationships and possible conflicts between the various PADs and multiple safety zones generated by the MFGs. As an example, if all the marker fields are pulsed continuously, then at any point the composite field between the marker fields is the vector sum of the fields. If a marker field also includes any IDs or similar data, it may be overridden by other marker fields or cause conflicts with other marker fields, producing errors. The PADs must be able to measure any of the marker fields in which they are located, to measure them, to know which system (or MFG) produced the marker field, and respond only to the marker field that should be responded to.

For example, consider a situation where a shuttle car is approaching a continuous miner to load coal. The shuttle car must approach a continuous miner until it makes contact with the miner, so that there is a significant overlap between marker fields generated by the two machines. There can be conflicts between the marker fields, which in turn is problematic for PADs being used in those areas. If the fields interfere or the PADs are unable to respond to both machines, the workers will not be fully protected.

It is sometimes very important that the safety system's warnings correspond appropriately to at least two levels of threat, while giving priority to the most serious threat. For example, in FIG. 1 two zone levels are defined by the magnetic marker fields. A Warning Zone 28, 58 is an area that should be avoided because danger is approaching. A Danger Zone 26, 56, is an area where a worker would be in imminent danger and should move immediately to a safer location, or should use an emergency stop feature, on his PAD for example, to stop the machine. In addition, Monitor Zones 24, 54 can be used to alert a worker that they are in the vicinity of a machine that is equipped with proximity protection, even though they are not in danger and may not receive an alarm. Other additional zones can be defined to allow other functions to be performed, such as authorizing PADs to transmit data for recording information from the system or environment that the PAD is sensing.

Some illustrations of situations that the safety systems must be able to handle are as follows. With reference to FIG. 1, worker A carrying PAD 30 and a worker B carrying PAD 32 are initially at the rear of vehicle 20, as shown. Worker B carrying PAD 32 then moves out of the Danger Zone 26 and into the Monitor Zones 24, 54, of vehicles 20, 40. Meanwhile, worker C, carrying PAD 34, leaves the cab of his vehicle 40 and moves from Danger Zone 56 to Danger Zone 26 at the rear of the first vehicle 20, to join the other two workers A, B. To accomplish these changes in position, workers B, C, have passed through multiple safety zones (marker fields) of two vehicles 20, 40. Worker C carrying PAD 34 passed through at least four zones, and passed though zones of both vehicles 20, 40, at the same time.

Not only must the magnetic marker fields of the two trucks 20, 40 not conflict, but also the PADs 30, 32, 34 must not conflict with each other or the MFGs. It is important that the systems be able to recognize that there are workers in their Danger Zones 26, 56, and if not, whether there are workers in their Warning Zones 28, 58. According to the invention, the PADs 30, 32, 34 warn the workers and the system warns the drivers of the trucks, without one safety system component masking or confusing another. The system of the invention, which includes, for example, the PING/ECHO technology as discussed in detail below, allows all these interactions to occur rapidly and without conflict.

has been demonstrated in the '443 publication that an oscillating magnetic field, operating at low frequencies provides a dimensionally stable marker field. It is also known that such low frequency oscillating fields will penetrate most materials, including earth formations; yet, do not radiate energy so that there are no multi-path reflections. The lack of radiation is due to the size of the generator elements being very small compared to the wavelength of the field, being greater than 4,000 meters for a 73 kHz oscillation. Another benefit from using non-radiating magnetic marker fields is that the strength of the magnetic field varies inversely with the cube of the distance from the field generator, as compared to RF emissions from antennas which reduce inversely with the square of the distance. This cubic relationship reduces the amount of conflict with other nearby marker fields, as compared with radiated RF waves, and also allows greater accuracy when determining distances from the sensors to the generators.

The invention provides a reliable and accurate method for allowing many active elements to be compatible and to cooperate with one another. The approach, in one embodiment, is to generate short pulses of magnetic fields in a controlled, semi-randomized manner, and, to obtain responses from PADs or TAGs, carried by workers, that sense those pulses. By generating short pulses in a semi-randomized manner, at the time of generating a PING, a timing window is set and the specific point within that timing window when the oscillation is to be produced is chosen by use of a random number generator. Also, if a burst of PINGs are transmitted, in response to which a burst of ECHOs may be produced, the time spacing between the PINGs may be a small timed window, which may be only a few milliseconds in duration, for example. The system is arranged so that multiple ECHOs from multiple PADs, and reflections of the ECHOS, will not impair proper operation. In addition, flexibility is provided within the system to allow important special features to be provided. For example, instead of generating a single PING, several PING can be produced sequentially by multiple generators, and the PAD can be programmed to wait until all the PINGs have been received before making logical decisions on the action to be taken.

There are various special situations that must be considered. For example, if a worker is positioned between two vehicles, a vehicle posing no threat to the worker must not mask the closer, or more dangerous vehicle. It is also critical that the operator know if any worker is potentially in danger, regardless of how many workers are in the work area. And, if automatic shutdown or slowdown features are being used by machines, the system must also be able to determine if any situations have reached such a level of potential danger. To accomplish these and other important functions, the components of the safety system provide logical functions, and communicate quickly and reliably. This is accomplished by using the combination of the short duration PINGs and short duration ECHOS, implementing narrow time duration windows for receiving PINGs and sending ECHOS, random time generation, and logical decision-making on both ends of the information exchange.

A PING/ECHO system provides a sound basis for the required system capabilities. PINGs are short in duration and are sent multiple times per second, in a semi-random manner so that there is time for PADs to receive PINGs from many sources. If the PAD is in a Warning or Danger Zone, it responds with an ECHO via an RF transmission of a particular duration at a particular time, information which indicates the zone that the PAD is in. Each system which produces PINGs also has a current alarm state representing the safety system's knowledge of workers in the protected zones. If a PING/ECHO sequence has occurred and indicated to the system an alarm level higher than the current alarm state, the system may produce a rapid burst of two or three or more PING/ECHO exchanges to verify that the initial PING/ECHO exchange was correct before entering a higher alarm state. The burst mechanism is designed to avoid false or nuisance alarms. If a PING/ECHO sequence fails to confirm a state, the process can be repeated multiple times per second.

Since the PINGs are sent out at semi-random time intervals, it is possible that two MFGs can produce PINGS which overlap in time. If a PAD is in the proximity of both of these MFGs, it may misread the field strength and may produce an erroneous ECHO in response. The burst confirmation sequence, in which multiple PINGs are sent as a group, but are separated by a short fixed or random period of time, is designed to greatly reduce the statistical likelihood of false alarm signals. The PINGs and the burst confirmation sequence are randomized to such an extent that it is very unlikely that the system will erroneously enter an alarm state even if several systems are operating near to each other. For example, once the first PING/ECHO exchange has been completed, three pulses can be sent with the condition that the space between the pulses be selected randomly from a set of numbers ranging between 250 microseconds and 5 milliseconds.

An important aspect of the PING/ECHO system is that all the PADs (or TAGs) in a given work complex can be made to respond in exactly the same way or some can be made to respond in different ways. Making all PADs or some groups of PADs in a work area to respond in an identical manner offers advantages. For example, they can each be programmed so that the signals from multiple PADs that happen to be in the same zone at the same time will reinforce each other. With this approach, a worker carrying a PAD can move from one work site to another, within the complex, and be sure of having the same level of protection. But, where special circumstances require, a PAD can be programmed uniquely and the system on a machine can be programmed uniquely. For example, if a truck is being protected from backing over a spoil and falling into a deep pit, a PAD can be attached to a pole that is positioned to be in the danger zone when the truck backs up to the desired dump point. It can be set to sense the field produced by an inductor at the rear of the truck. The inductors at the rear of the truck would typically define a hazard zone. The sensitivity of this PAD may need to be set in a different range that other PADs worn by workers, though not necessarily. The circumstances and operation scenarios would need to be considered. But, the PAD could also be programmed to respond only to the generator at the front of the truck, which would have a field extending to near the last axel of the truck, for a typical PAD setting. The PAD would know which generator was at the front of the truck because of the known sequence in which the fields would be produced by the three generators (a typical configuration). However, this must be done very carefully so that use of the standard configured PADs will continue to provide the same protection.

In some work areas, workers must be close to the side of vehicles or machines, but should not be behind those vehicles or machines, at least when they are backing up. It is helpful in those cases to narrow the marker field so that the workers can be closer to the side of the vehicles without initiating an alarm on their PAD or alarm the operator. Since one important characteristic of the low frequency magnetic marker fields is that their shape tends to be very predictable and constant, the fields cannot, from a practical standpoint, be shaped to be made narrow at the side of vehicles or machines. The invention discloses use of multiple marker field generators to modify the shape of the marker fields. One way to modify the shape of a magnetic marker field is by reversing the phase of one or more of multiple generators. More control over the field shape can be accomplished by considering the fact that according to the invention the marker fields may not exist concurrently. By requiring a PAD to be in the same zone of two generators, the shape of that zone is reduced to the area of overlap by the fields because the areas of overlap of the two generators is smaller, located between the generators. If inductors that are generating the fields are, for example, at the rear corners of a truck, then the overlapping fields will be centered on the rear of the truck and their width with be determined by the strength of the fields and the sensitivity to which the PADs have been programmed.

Further, the requirement can be placed on the PAD, by use of the software in the microcontroller, to exclude areas of overlap from the zone. By combining the PING/ECHO method with logical capabilities in the microcontrollers, significant shaping of the protection zones is accomplished. For example, the zone for a truck backing up can begin near the rear of the truck and extend behind the back of the truck with an arrowhead shape. This produces an ideal zone of protection. Personnel forward and rear of the tailgate would not be in an alarm zone and the driver would not be in an alarm zone.

Figure 6:
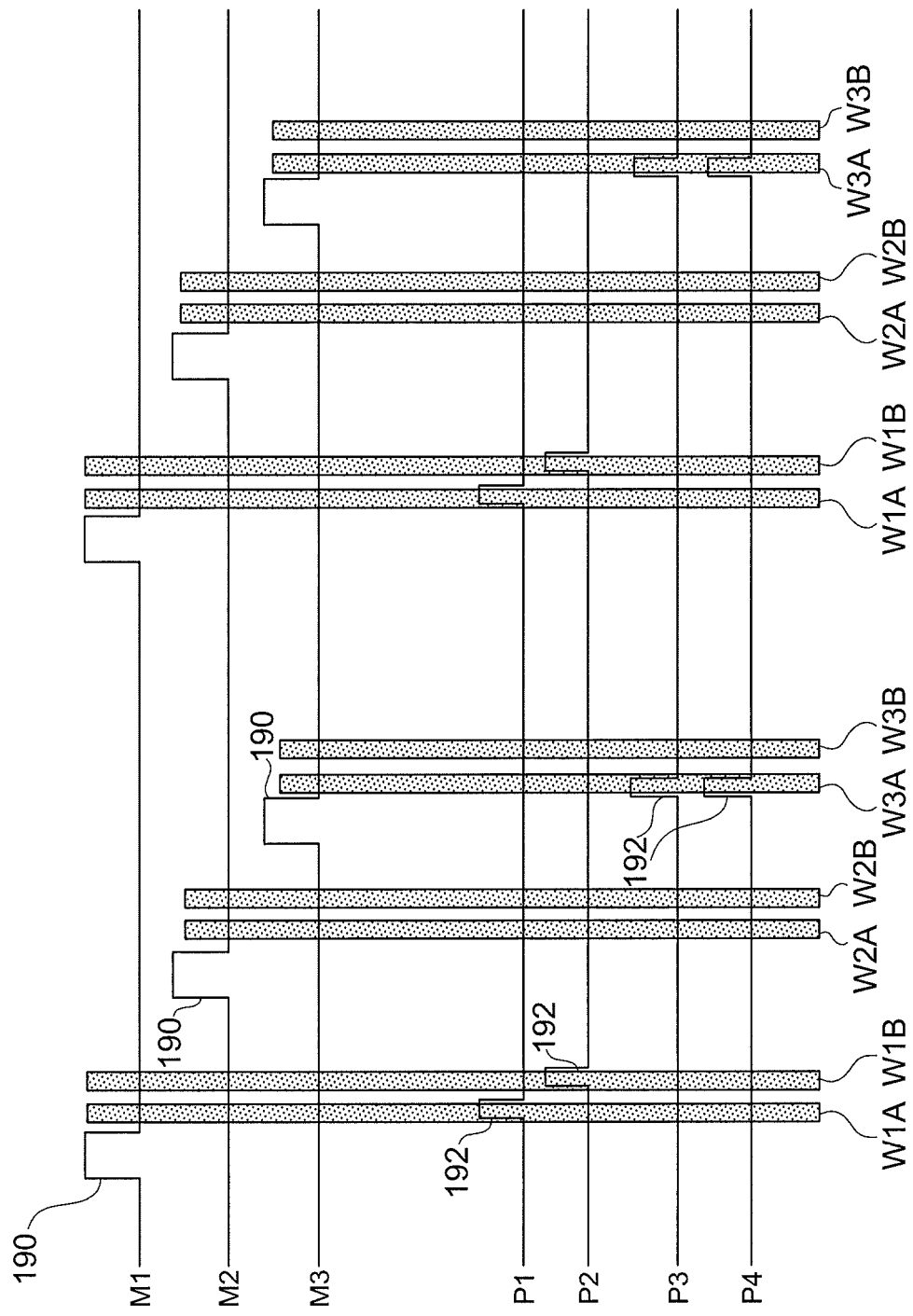
FIGS. 6 and 7 show timing diagrams of communications between safety system components in accordance with an embodiment of the invention.
Figure 7:
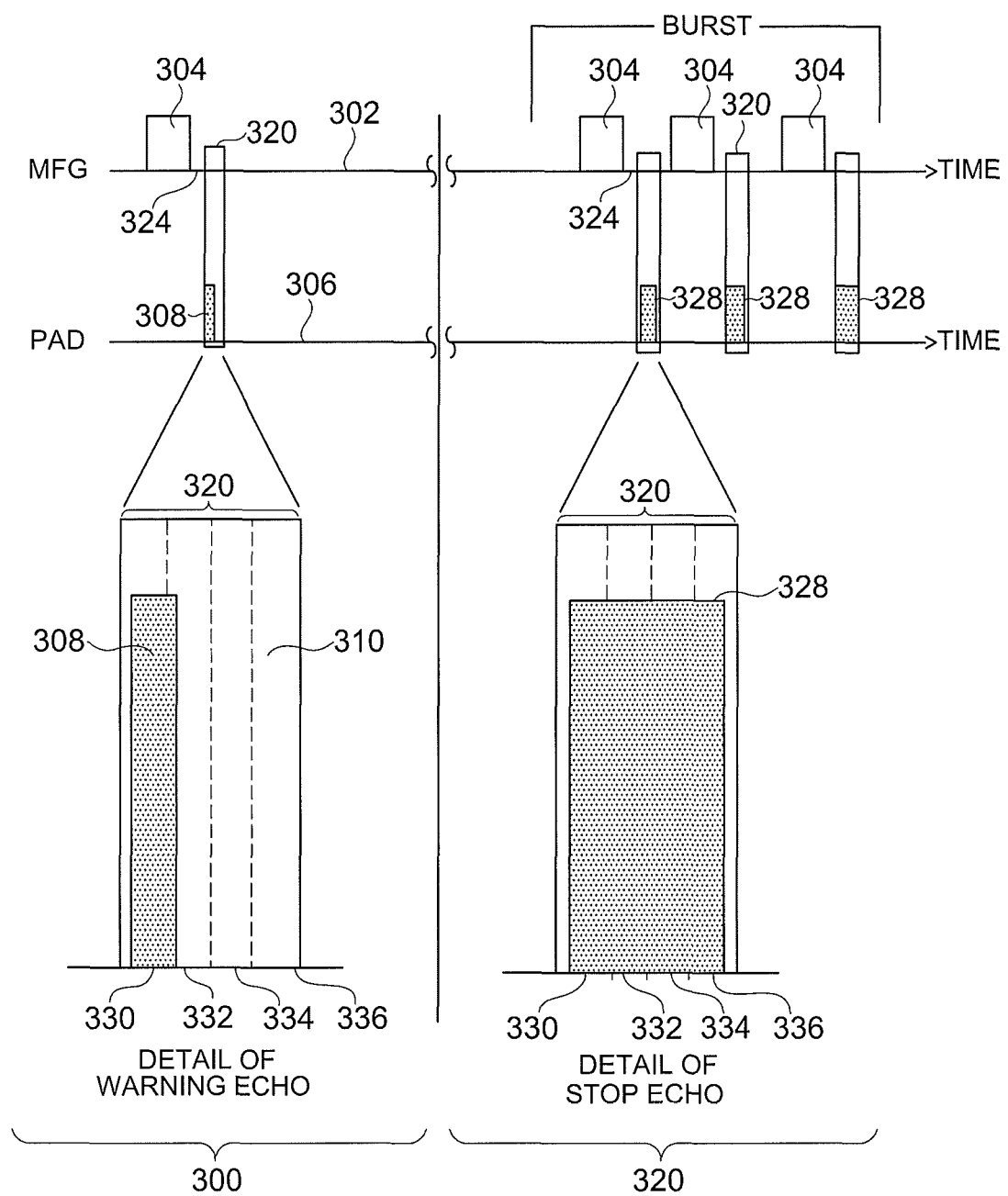

Multiple marker fields can occupy the same space by limiting each one to short periods of time duration, producing a pulse or PING that, for example, may only be about 1 millisecond in duration, which is about 73 cycles of the 73 kHz oscillation. Since there is the possibility that two generators in close proximity might happen to be synchronized, so that the PINGs from the generators occur at or nearly the same time, the time durations between the PINGs are randomly chosen within a time window (FIGS. 6 and 7). This way, if the generators happen to be synchronized, the probability of a conflict between responsive ECHOs is greatly reduced.

A known problem is that ECHOs in the form of RF transmissions from other PADs, in response to other PINGs, could, in error, be accepted as ECHOs by the MFG 80 (FIG. 2). To address this problem, the receiver 96 in the MFG 80 looks for the return ECHO to appear during a specific time window, for example a time window of one or two milliseconds following the sending of the PING. Moreover, a predetermined time delay may be implemented after sending of the PING and before the specific time window begins. This way, in order for a stray pulse from some other source to be erroneously accepted as a responsive ECHO, it must occur within the precisely defined window.

But, there is still a possibility that an error could occur, even though the possibility is small. To make sure that the RF signal received is a valid ECHO, the system of the invention can be operated to send a series of PINGs in a burst, and then the corresponding ECHOs are received and analyzed. This burst of PINGs is performed quickly before the next PING window is available from any other MFG that might have sent a PING at the same time. In the unlikely case where a PAD is in the same zone of two MFG systems on two vehicles or machines, and they also happen to have been synchronized at the moment that the PAD entered the zones of both MFG systems, that PING/ECHO burst sequence would be rejected. However, the whole process will begin again within the next PING window, when the next randomly generated PING will be sent, typically between 0.050 and 0.250 seconds later. The extremely small probability of this entire sequence coincidentally happening again is so small that it can be ignored. In order to verify that the ECHO is valid, the above sequence can be repeated several times, very quickly. If all responsive ECHOs to the repeated sequences of PINGs are not received as expected, the microcontroller 82 assumes that the initial ECHO was invalid and takes no further action unless subsequent PINGs result in a valid ECHO. But, if the ECHO is confirmed to be valid, the microcontroller 82 will take the action it has been programmed to take.

An alternate strategy to using a burst of PINGs to ensure that an ECHO is valid is to produce PINGs on a random basis, within selected time periods, and to require that a sequence of PINGs and ECHOs be received to establish that a valid reading and response has been accomplished. Also, the timing windows established for receiving the ECHOs can be variable within a string of PING/ECHO exchanges to further reduce the probability of noise from other sources being interpreted as PINGs or ECHOs. The length of the PINGs and ECHOs and the receiving windows may also be varied in timing and/or in duration for responses representing differing levels of danger. Once the PING/ECHO system has been architected according to the invention so that the PING is produced by the magnetic marker field and the ECHOs are returned by RF link various combinations of timings and durations of transmissions and space between transmissions may be employed.

It can be appreciated, therefore, that any generator can produce its marker field without interfering with another field. It also follows that the ECHO can reliably indicate that a PAD is either in the Warning Zone, Danger Zone, or other defined zones, without a conflict. The microcontroller 82 in the MFG 80 can then reliably give priority to an ECHO from a PAD in the Danger Zone over the priority given to a PAD in the Warning Zone, for example.

Some of the versatility of the PING/ECHO concept is demonstrated by the way that the protection zones or danger zones can be shaped. A magnetic marker field generated by use of a ferrite has a shape with a cross-section that is approximately that of an ellipse. As explained above, the marker field is stable and reliable, and maintains its shape. If multiple generators are used, however, the shape of the resulting marker field can be modified by the techniques disclosed herein. Two generators can be used to produce overlapping marker fields, and be timed so as not to occur at the same instant in time. The PADs to be used in such work sites can then be programmed to only alarm when the PAD is within the zone of both generators, i.e., only when the PAD senses PINGs from both or multiple generators. If needed, it is possible to have three or more generators on large equipment, to produce even more restricted fields. In addition, the overlapping fields can be adjusted to have different strengths in order to further alter the shape of the zones. According to the invention, adjustment of the strength of the fields produced by each MFG can be accomplished by adjusting the width of the pulses that drive the current through the generator. It is also possible to program the microcontroller in the PADs to have different sensitivity to the MFG fields which will adjust the size of the fields, thereby adjusting the size and shape of the hazardous zones on a vehicle or machine. It is also possible for the microcontroller to output the signal to the generators such that the fields are opposing rather than reinforcing each other in order to produce special field configurations. Three or more generators can be used to further restrict or modify the protection zones or danger zones.

Figure 3A:
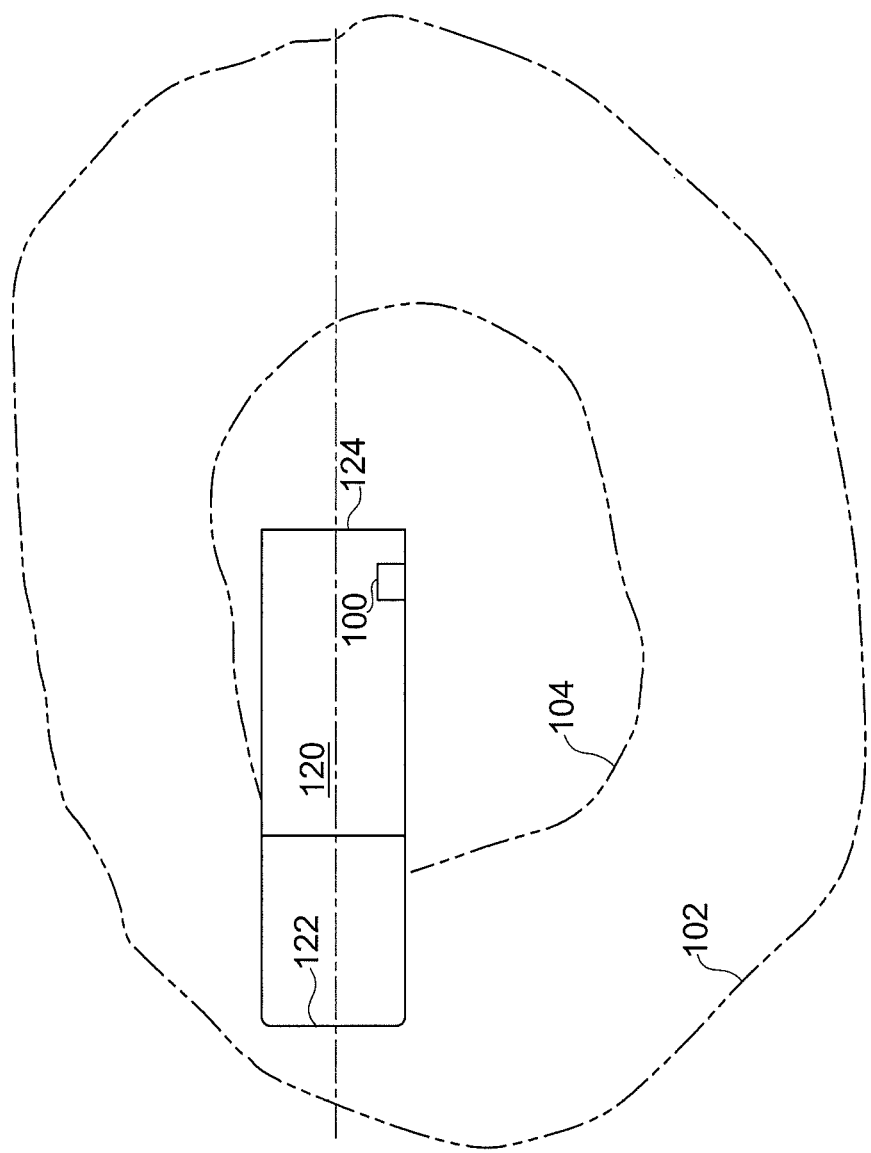
FIGS. 3A-3D show a vehicle having a safety system adapted for shaping a marker filed in accordance with an embodiment of the invention.
Figure 3B:
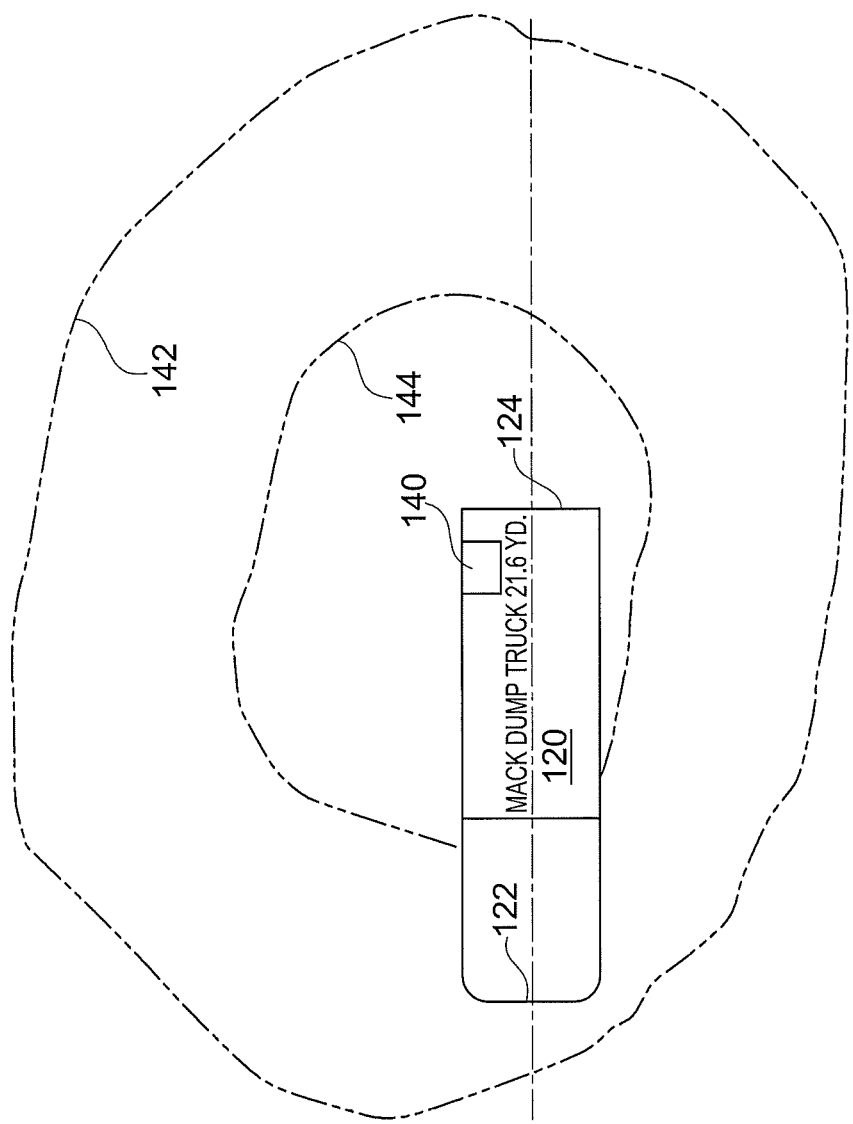
Figure 3C:
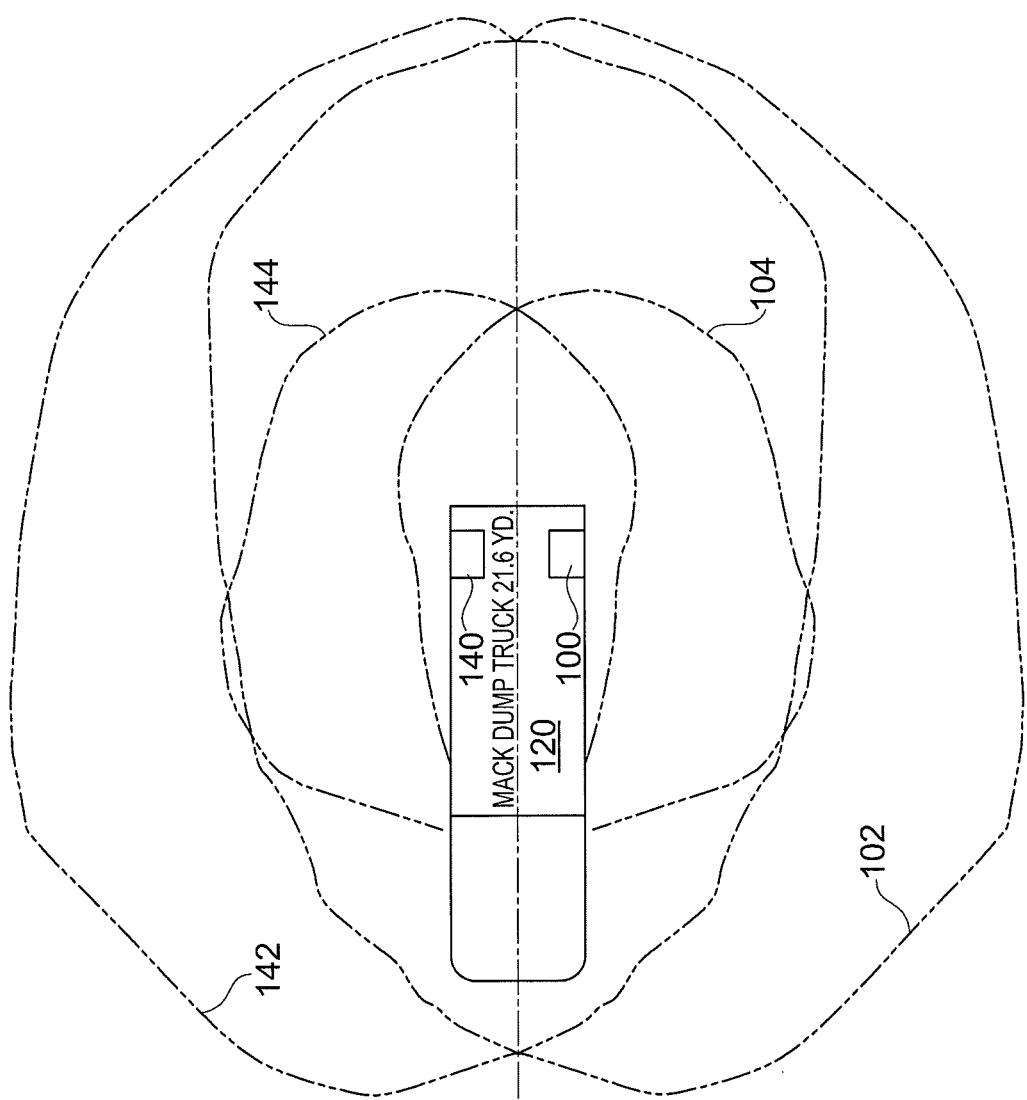
Figure 3D:
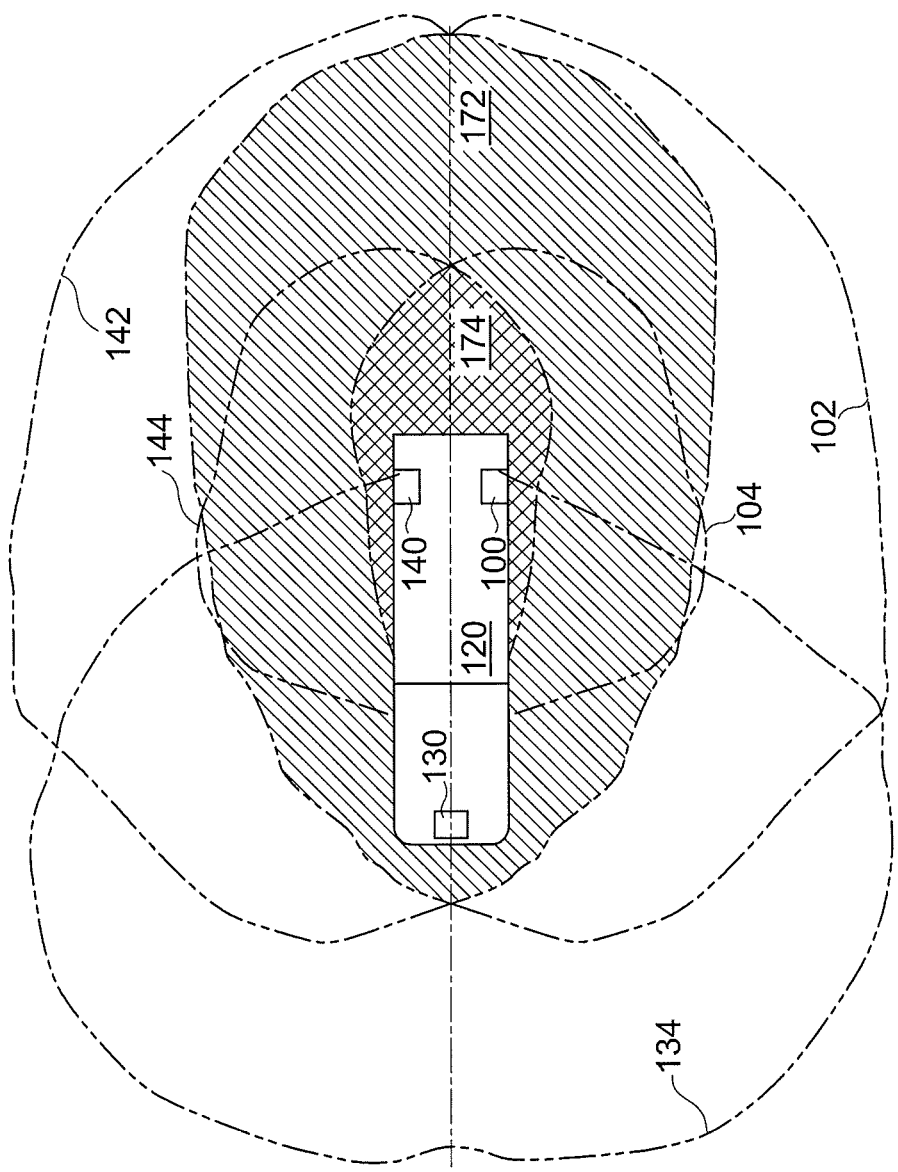

An example of the effectiveness of the zone shaping feature is shown in FIGS. 3A-3D and 4, in which the effect of combining marker fields of three generators is shown in sequence. The FIGS. have been prepared based on actual test data and tests conducted by the inventors. FIG. 3A shows a vehicle 120 having a front 122 and a rear 124. In FIG. 3A, a Warning Zone 102 and a Danger Zone 104 are pulsed or otherwise generated by MFG 100. The MFG 100 is located at the left rear of the vehicle 120. In FIG. 3B, MFG 140 is shown, being located at the right rear 124 of the vehicle 120. MFG 140 creates a Warning Zone 142 and Danger Zone 144. Next, FIG. 3C shows the areas of overlap of the marker fields produced by generators 100, 140 (as shown in FIGS. 3A and 3B). In an embodiment, it is these areas of overlap that are to be avoided by the workers. FIG. 3D shows a Warning Zone 172, a Danger Zone 174, and a Safe Zone 134 that have been constructed by overlapping the marker fields. The Warning Zone 172 and the Danger Zone 174 are created by requiring a PAD to determine if it is within the Warning Zones 102, 142 of both MFGs 100, 140, on the rear of the vehicle 120. Similarly, the PAD will determine if it is within both Danger Zones 104, 144 of those generators. The Safe Zone 134 is created by adjusting the strength of the field produced by the MFG 130 on the front of the vehicle 120 such that the Warning Zone reaches to approximately the location of the third axel of the truck, for example.

Figure 4:
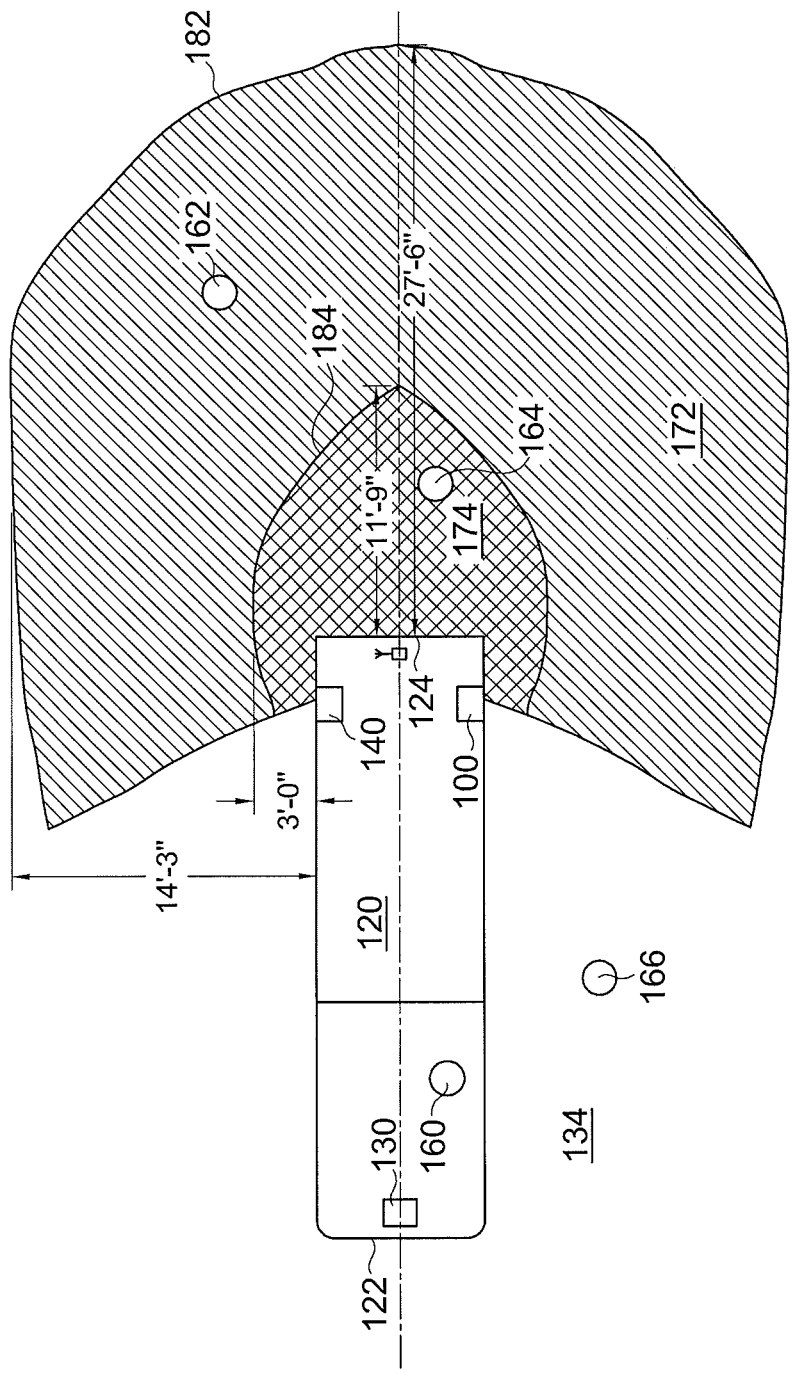
FIG. 4 shows a shaped marker field of the safety system illustrated in FIGS. 3A-3D.

A completed shaped zone of the safety system is shown in FIG. 4. FIG. 4 shows the complete shaped zone, adding the Safe Zone 134 produced by the third generator 130. In the shaped zone, the Safety Zone 134 is excluded from the overlapping Danger and Warning Zones created by the MFGs 100, 140. One technique for excluding the Safety Zone 134 is by having the PAD recognize the sequence in which the maker fields are pulsed (for example, the Safety Zone 134 would be the third PING sensed by the PAD) and recognizing the particular strength of the Safety Zone 134 created by MFG 130. FIG. 4 shows three workers 162, 164, 166, and a driver 160 around the vehicle 120. Two magnetic marker field generators 100, 140, shown mounted (and shown electrically connected in FIG. 5) have been placed near the rear 124 of the vehicle 120. The fields, indicated by the zone boundaries 182, 184 from these generators roughly approximate the shape of an ellipse, but are combined to define the Warning Zone 172 and Danger Zone 174. These zones 172, 174 should be avoided, except that a worker in the position of worker 166 really is in no danger and may have a need to be in that position. A novel aspect of this invention is to add a field that represents a Safe Zone 134 that can be used to supersede the effects of the overlapping hazard zones, but only in an area known to be safe. If a PAD is within the Warning Zone of a particular field, produced by a particular inductor, that knowledge is used to ignore being within the zones of other generators. Therefore, if the intersection of two danger zones produces a field that is larger than desired in some direction, the use of the third generator allows limiting the size of the field in the direction of the third generator.

As explained earlier, the overall size of the field produced by each generator is determined by the power put into the generators, and by the sensitivity of the PADs that detect the fields. The input power and the PAD sensitivity can be adjusted by changes in the software, for example. Changes to these parameters, made by the software, could be initiated by use of switches on the PADs or by use of switches that signal a microcontroller to make such adjustments. While the two generators 100, 140 at the rear of the truck define the Warning Zone 172 and the Danger Zone 174, a third generator 130 defines a Safe Zone 134. The third generator 130 is shown located forward of the other generators 100, 140, near the front 122 of the truck 120. It could also be positioned at other forward locations. The marker field produced by this third MFG 130 defines the Safe Zone 134. When in this zone, there will be no alarms from PADs, such as for worker 166 or to the operator 160. Having defined the zone to be avoided at the rear of the truck and having defined a Safe Zone forward of the tailgate, the resulting shaped zone to be avoided is made ideal.

Figure 5:
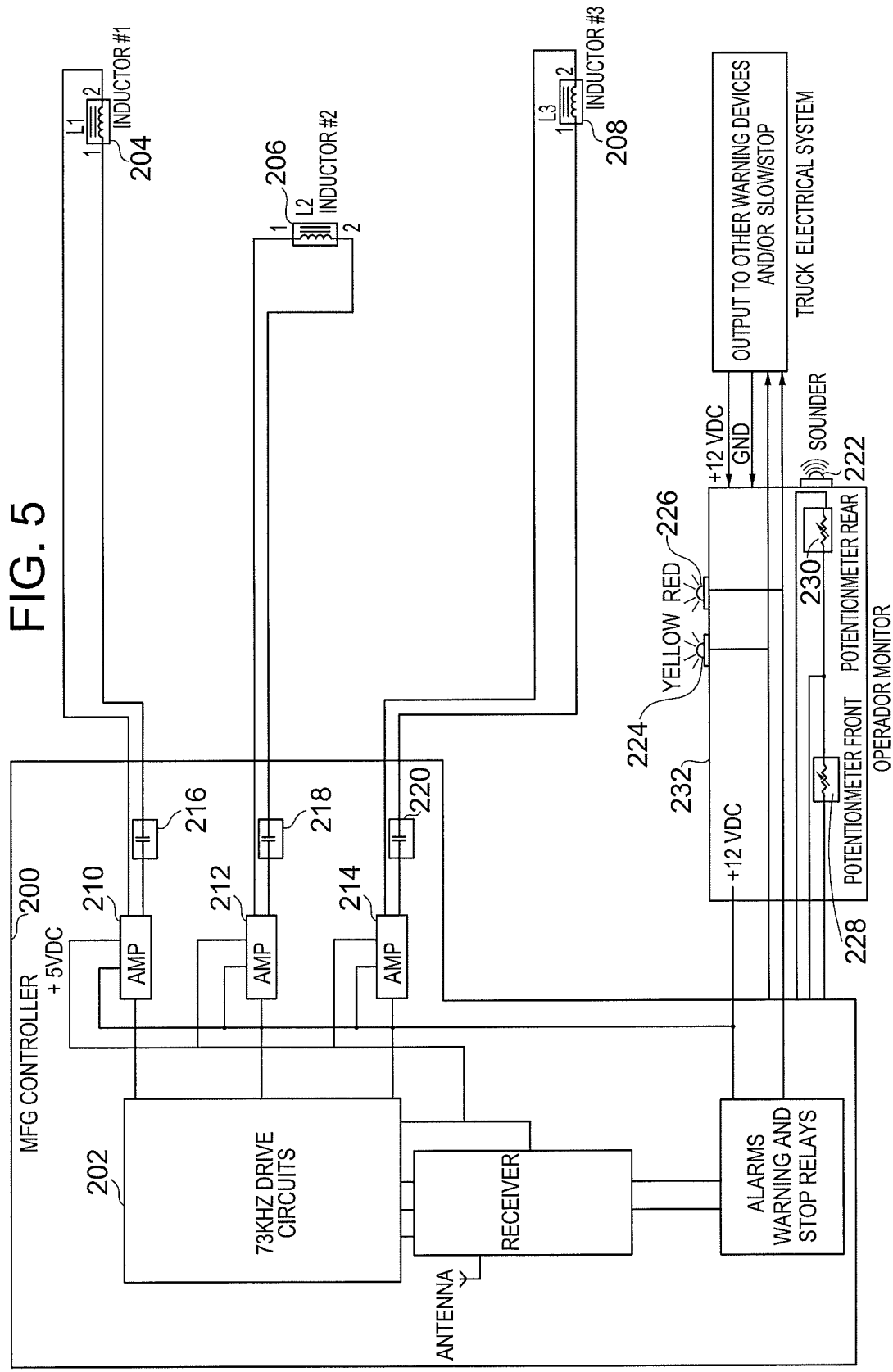
FIG. 5 shows a schematic of a marker field generator in accordance with an embodiment of the invention.

Now, explanation on how the pulsing from the PING/ECHO system functions in combination with the pulsing from PADs. A block diagram shown in FIG. 5 depicts a practical arrangement of system components to produce shaped hazardous zones and safety zones, as described above. Microcontroller 202 produces a 73 kHz oscillating waveform, typically for a period of one millisecond. Although the frequency of the oscillations and the duration of the pulse of oscillations can be programmed, they must be controlled very precisely. The microcontroller 202 decides which inductor 204, 206, 208, is required in the pulse sequence, and sends the signal to the amplifier 210, 212, 214, associated with that inductor. These signals are then amplified and the resulting current is sent through the The capacitance assemblies 216, 218, 220 may include adjustments to allow tuning of the circuit to resonance in order to maximize the output of the field. Or, they may be adjusted to de-tune the circuit to reduce the amount of current, and, thus, the size of the marker field. As explained earlier, the average oscillating current through the tuned circuit can be adjusted by programming the width of the waveform sent to the amplifier. With reference to FIG. 4, a PAD worn by a worker 162 located in the region 172 will measure the strength of the fields produced by both MFGs 100, 140 and determine that it is measuring a field strength from both MFGs 100, 140, that indicate it is in the Warning Zones of both. Pulses from the MFGs are produced by the microcontroller 202 in the MFG Control Assembly 200, amplified by the amplifiers 210, 212, 214, and then forced out around the inductors 204, 206, 208. These pulses are produced in sequence by the three inductors, so that only one inductor is producing a marker field at any point in time. These field pulses are the PINGs, as discussed herein.

When the PAD worn by worker 162, shown to be in the cross-hatched area 172 determines that it is in the Warning Zone of both generators, it is prepared to alarm the worker who is carrying the PAD and to send a warning to the operator 160 in the vehicle. The PAD, however, also checks to determine if it is in the safe zone. If not, it sounds an alarm and may also illuminate an LED, and send a signal to the operator 160 to sound an audible alarm 222 and to illuminate an LED(s) 224, 226, to alert the operator that a PAD is in the Warning Zone. If it were in the Warning Zone of the third inductor, such as at the location of PAD 166, it would indicate that the worker is too far forward toward the back of the truck to be in danger of being backed over, meaning that it is in a Safe Zone 134, and would therefore not set an alarm. However, since the PAD is to the rear of the truck, it will not determine that it is in the field of the third inductor and, therefore, it will sound an alarm to the worker, both audibly and visually, and alarm the truck driver 160, both audibly and visually.

Now, consider the third PAD worn by worker 164. For the configuration shown in this illustration, there is an area where the Danger Zones of the two generators at the rear overlap, shown as double cross-hatched, and PAD 164 is located in this zone. PAD will sound a Danger Alarm and initiate an alarm in the cab of the vehicle, both audibly and visually. When PAD 164 looks for the PING from the third generator 130, it will not be seen because the safety zone field has been adjusted to end a few feet forward of the back of the truck 124. Therefore, it will act upon being in the Danger Zone 174, alarming the worker 164 and alarming the driver 160 in the cab.

An exemplary diagram of communications between MFGs and PADs is shown in FIG. 6, where lines M1, M2 and M3 depict the output (pulses) of MFG1, MFG2 and MFG3, respectively, as each MFG sends a PING 190. Lines P1, P2, P3 and P4 illustrate an output of PAD1, PAD2, PAD4 and PAD4, respectively, the output being VHF radio frequency ECHOs 192. In this example, all three MFG's can receive the signals from all four PAD's, and vice versa. MFG1 looks for the presence of an ECHO signal during the predetermined time windows labeled W1A and W1B. MFG2 looks for the presence of an ECHO signal during the time windows labeled W2A and W2B. And, MFG3 looks for the presence of an ECHO signal during the time windows labeled W3A and W3B.

In the illustrated example, PAD1 senses the PING 190 from MFG1, measures the signal strength and determines that it is in a danger zone, and responds by emitting a pulse on the VHF channel, after a predetermined time delay. An exemplary predetermined delay is approximately 1 millisecond, but can be up to approximately up to 10 milliseconds depending upon other considerations. PAD2 senses the PING 190 from MFG1, measures the signal strength and determines that it too is in the warning zone, and responds by emitting an ECHO on the VHF channel, after a predetermined time delay, which may be different that the predetermined time delay for PAD1. PAD3 senses the PING 190 from MFG3, measures the signal strength and determines that it is in the danger zone, and responds by emitting a pulse on the VFH channel, after a predetermined time delay. PAD4 senses the Ping from MFG3, measures the signal strength and determines that it is in the danger zone, and responds by emitting a pulse on the VFH channel, after a predetermined time delay.

Since MFG1 detects an ECHO on the VHF channel during time window W1A, it interprets that as an indication that a PAD1 is present in its marker field within a danger zone. MFG1 also senses a VHF signal in time window W1B and determines that PAD2 is also present within a warning zone. MFG2 does not sense any ECHOs on the VHF channel during any of its time windows W2A and W2B, and concludes that no PAD is in either of its danger/warning zones. MFG3 detects a signal during time window W3A, and concludes that there must be at least one PAD in its danger zone. Since it is possible for an unrelated pulse to occur in these time windows, the MFG's do not set off an alarm condition until they receive an ECHO in the same time window following at least two successive PINGs, for example.

Referring now to FIG. 7, details are provided regarding how pulsing of PINGs and ECHOs can be timed to make the PING/ECHO exchanges occur without conflict. The left half 300 of FIG. 7 represents a PING/ECHO event for a PAD that enters or is within a Warning Zone. The line 302 is a timeline showing PING pulses 304 produced by an MFG. The line 306 is a timeline of ECHO pulses 308 produced by a PAD. The ECHO pulses 308, according to the invention, occur after a predetermined delay 324 that may be from less than one millisecond to a few milliseconds. Element 310 is a detail of the ECHO event, and shows the ECHO 308 within the ECHO event 320. The ECHO event 320 is comprised of time periods 330, 332, 334 and 336. The ECHO event 320 represents the time duration window preset in the MFG to receive the ECHO. ECHO bar 308, inside the ECHO event 320, represents a short pulse from the PAD that must occur in the first time portion 330 of the time window 320, for example.

The right side 320 of FIG. 7 represents a PING/ECHO exchange for a PAD that enters or is within a Danger Zone. Note that the ECHO 328 in this example is required to be long enough to appear in all time portions 330, 332, 334, 336, of the time window 320. Also shown are two additional PINGs 304, and two additional ECHOs 328. The three PINGs comprise a burst, in which the PINGs may be separated by 1-10 milliseconds. In the illustrated embodiment, the MFG and the PAD set an alarm after all three ECHOs have been received within a time window. With PINGs being very short, multiple PINGs can be generated each second by a MFG, assuring that a PING/ECHO exchange can be made without conflict. A statistical calculation can be made to indicate the high probability of successful PING/ECHO exchange without conflict from a nearby system. A PING may be sent, for example, approximately once each 0.125 seconds, on the average, within a window of 0.050 and 0.250 seconds.

The simple chance of a successful exchange without a conflict between the PINGs from two systems is 124/125 during the first window. The probability of not being able to make a successful exchange in a full second is equal to $(1/125)^8$, roughly $6 \times 10^{-16}$. Whenever multiple generators, many PADs, longer pulses for shaping, and the possible conflicts between ECHOs are considered, the probability of a successful exchange in even a half second is very large, remains so large as to not to be of any practical concern. Similarly, the probability of a false PING/ECHO happening, considering the requirement of three complete, randomized PING/ECHO exchanges, is very small. Tests have confirmed very high reliability. It should be noted that the problems mentioned earlier concerning multi-pathing, reflections, interference, etc do not affect the ECHO since the requirement is only to receive a pulse of specified duration at a specified point time.

Note that in FIG. 4 that the truck driver 160 is in the Safe Zone 134 so that his PAD will not set an alarm and he is free to leave the truck without entering the Warning Zone 172 or Danger Zone 174. Other workers may approach the driver 160 to have a face-to-face conversation without setting off an alarm. Provisions can also be made for use of a reverse signal from the truck system to turn off the protection system except when the truck is in reverse, as was done in the evaluation described in SAE:2007-01-4233. However, with the Safe Zone 134 being defined the way it is, the need for a reverse-only protection is reduced. In some instances, having the system activated only when the vehicle is in reverse can create an unsafe condition since there may not always be a lengthy delay between the time that the truck is placed in reverse until it begins to move backward. Safety reports on fatalities show this to be true. An example is a case where a vehicle is parked on a slope so that it can begin moving in reverse before the clutch is engaged.

With reference to FIG. 5, potentiometers 228, 230, are provided in the operator monitor 232, which is typically located in the cab of the vehicle, that are used to reduce the size of the magnetic field if that is desired. Holes are provided in the housing of the Monitor so that a screwdriver may be inserted to make the adjustment. A voltage derived from the position of the potentiometers 228, 230 is used as an input to the microcontroller 202 which makes a reduction, if necessary. The reduction is accomplished within the control assembly 200 by shortening the width of the 73 kHz square wave signals that drive the amplifier 210, 212, 214.

By shortening these signals, less energy in input to the resonant LC circuit, thus reducing the average current through the LC circuit and reducing the size of the magnetic field.

Signals are available at the operator monitor 232 to be used in the vehicle's electrical system to slow or stop a vehicle if that is appropriate for the particular vehicle in a particular work environment where this feature is desirable. Additional lights or horns can be installed on the rear of the truck to be sounded for a Warning or Danger condition. The lights can be made to flash at differing rates to differentiate a warning condition from a danger condition. Similarly, a horn can be sounded in different ways for the same purpose. The PAD usually provides a beeping for a warning with the speed of the beeping increasing as the PAD is further into the Warning Zone, and then giving a constant beep or a fast triple beep to indicate that it is in the Danger Zone.

The systems of the invention may be installed near a particularly dangerous zone, which could be related to the geology of that particular location, so that a person carrying a PAD will be warned before entering the zone. The system may also be installed on dangerous equipment and may be operated so that the dangerous equipment will be stopped whenever a person approaches too closely. The equipment may be stopped following or commensurate with issuing a warning to the person by audible sounds or lights. These warnings may be issued by the PAD or by the system that is installed on the equipment, or both. Zone monitoring systems of this type can may be battery operated, making them portable.

Whenever a PAD enters a defined hazardous zone, the logic in the microcontroller is instructed to operate in a special way, called being in an ALARM STATE. Once in this ALARM STATE, it begins to perform other functions that need to be performed once it has been determined that the PAD is within a hazardous zone. The active ALARM STATE directly determines, for the protected machine, which (if any) alarms are sounded and/or which other actions are taken such as slowing or stopping the machine. The system also keeps track of other internal state information—such as the history of the ECHOs received in response to recent PINGs. The system enters a higher ALARM STATE only after multiple PING/ECHO sequences have confirmed that a PAD is in a zone where a danger exists. The system enters a lower ALARM STATE only when some period of time has elapsed during which it has received no ECHO of the type which would indicate that it should remain in the elevated ALARM STATE.

The invention provides other features that work in conjunction with the PING/ECHO proximity protection system. For example, data is transmitted via an RF link from the PAD on a regular basis to provide information related to the safety of the worker and allows tracking of the worker during emergency conditions, the latter being most needed in underground mining. Also, the system provides a worker with the capability to use switches on the PAD to make responses to the machine, machine operator, or to signal through other communications channels, particularly during an emergency. Provisions may also be made to use the RF link in the PAD to transmit voice signal, by adding a microphone to the PAD, or to transmit other information available to the worker and regarding the worker's environment, such as dangerous gas concentrations, vital body functions of the worker such as heart rate, etc. by inputting the information to the RF transmitter. Tracking nodes can be placed in the work area to collect such information from PADs and forward that information to other locations.

Memory modules are included in MFGs to store safety related information for routine safety evaluation or for analysis following an incident. For underground mining applications, this can include sending information to VLF or ULF Through-The-Earth transmitters during emergencies when communications to the surface have been disrupted or through MF transmitters within the mine. The PADs or TAGs used with the PING/ECHO system may be combined with the cap lamp assembly that is worn in underground mining so that they can draw power from that source. Other sensing devices can be integrated into the PAD/Cap Lamp Assemblies in order to take advantage of the RF transmission capability, portable power, and the microcontroller.

The invention can also be used to avert collisions between vehicles when their speed is sufficiently slow, less than about 20 feet/sec (approx 6 meters/sec), for example. At higher speeds, the size of the field required to give a timely warning may be greater than the marker field that is produced. The size of the marker field may be limited because to double the size of the field, the current through the inductor must be increased by a factor of eight for a given input voltage, which would require significant equipment modifications. A PAD, or another similar device, is placed on the vehicle, along with a MFG. A circuit from the MFG to the PAD is used to disable the PAD during PINGs from the MFG. If the PAD senses another vehicle in its Warning Zone or Danger Zone, it alarms the operator of the vehicle. Signals from the MFG can be used to slow or stop the vehicle if that is desirable.

Situations arise in which there is a need to warn a driver of a vehicle that the vehicle should be stopped, even though there are no other workers close to the vehicle. For example, many people have been killed and others have been seriously injured when drivers backed trucks to a high dump point, but have gone too far and the truck becomes stuck, or worse, falls over the ledge of the dump. A TAG can be positioned at dump points to let the driver know when they should back up no further. Such a TAG can also be located on loading docks so that a truck driver can be informed when the truck is about to contact the dock, thus preventing damage to the truck and/or dock. Operators of vehicles may be frequently getting onto their vehicles and then getting off again in order to perform various tasks. When on or in their vehicles, the operators may not be in danger of being harmed by other equipment. But, when the operator leaves the vehicle, the operator may then be exposed to threats from other vehicles or dangers and needs to be protected. This special protection feature can be complemented by use of a switch on the PAD.

If a worker approaches a vehicle that does not currently have an active operator, that worker can request that the system designate him as the operator. This is accomplished by pressing a button on his PAD while in the Warning Zone for that machine. The PAD carried by that worker will send the request, along with the ID of that PAD. The MFG will then designate that PAD as belonging to the operator and send a special pulse back to the PAD while the button is depressed. That PAD will no longer alarm and the MFG will ignore it as well. The PAD will periodically transmit its ID, typically each 10 seconds, as part of a data set. So long as that PAD remains at or on the vehicle, another worker cannot become the operator of that vehicle. If the current operator leaves the vehicle but returns before another operator has been assigned operator status by that vehicle, the PAD will recognize that the PAD still has operator status and will not respond.

There can only be one operator per vehicle, however. If the operator leaves the vehicle such that the data set is not received within the time period planned for the periodic data sets, to show that the operator is still within the marker field, then the operator status of that PAD will be placed in suspension. If another worker requests operator status for that vehicle while the earlier operator has suspended status, the new worker will be accepted as the operator and the earlier operator will lose his operator status. If power to the MFG is briefly interrupted, the PAD may alarm until the next data set is sent or until the operator presses the switch again. If the operator turns off power to the MFG and dismounts, the process will start at the beginning when another worker arrives or that operator returns and requests operator status. Whenever an operator with a PAD leaves the marker field of the vehicle for which it has operator status, the PAD will respond to other marker fields in a normal fashion. From the operator point of view, this process will be simple, essentially transparent. When the operator turns on the power to his vehicle, his PAD will begin to sound. The operator presses the switch on the PAD and the warnings will no longer be given and the PAD will not respond to any PINGs from marker fields.

The above description and drawings are only illustrative of preferred embodiments of the present inventions, and are not intended to limit the present inventions thereto. Any subject matter or modification thereof which comes within the spirit and scope of the following claims is to be considered part of the present inventions.

What is claimed as new and desired to be protected by Letters Patent of the United States is:

1. A method, comprising the steps of:
generating, by a magnetic field generator, a magnetic field during a first time period;
sensing by an alarm device the magnetic field and generating a response signal during a second time period; and
sensing by the magnetic field generator for the response signal within a second time period, wherein the second time period comprises a plurality of time portions;
wherein the alarm device generates the response signal during a first number of time portions when the alarm device detects the magnetic field at a first strength and generates the response signal during a second number of time portions when the alarm device detects the magnetic field at a second strength.

2. The method of claim 1, wherein the first strength is less than the second strength and first number of time portions is less than the second number of time portions.

3. The method of claim 2, wherein the response during the first number of time portions indicates the alarm device is in a warning zone.

4. The method of claim 2, wherein the response during the second number of time portions indicates the alarm device is in a danger zone.

5. The method of claim 4, wherein the second number of time portions is all of the plurality of time portions.

6. A safety system, comprising:
a generator that generates a magnetic field, the generator being configured to receive at least one response signal; and
an alarm device adapted to sense the magnetic field and generate the response signal;
wherein the generator generates said magnetic field during a first time period, and senses for a response signal from the alarm device within a second time period, wherein the second time period comprises a plurality of time portions;
wherein the alarm device is adapted to generate the response signal during a first number of time portions when the alarm device detects the magnetic field at a first strength, and
wherein the alarm device generates the response signal during a second number of time portions when the alarm device detects the magnetic field at a second strength.

7. The safety system of claim 1, wherein the generator is positioned at a vehicle.

8. The safety system of claim 7, wherein the alarm device is positioned at least one of a dump point, a loading dock, or a person.

9. The safety system of claim 7, wherein the vehicle is a first vehicle, and the safety system further comprises a second vehicle, the alarm device being positioned at the second vehicle.

10. The safety system of claim 9, wherein the generator is a first generator and the alarm device is a first alarm device, and the safety system further comprises:
a second generator similar to the first generator, and a second alarm device similar to the first alarm device;
the second generator being positioned at the second vehicle, and the second alarm device being positioned at the first vehicle.

11. The safety system of claim 10, further comprising:
a first circuit connecting the first generator and the second alarm device, wherein the circuit is adapted to disable the second alarm device during the time the first generator generates the magnetic field.

12. The safety system of claim 10, wherein the second alarm device is adapted to generate an alarm when it senses the magnetic field of the second generator.

13. The safety system of claim 1, wherein the first strength is less than the second strength and first number of time portions is less than the second number of time portions.

14. The safety system of claim 6, further comprising:
a plurality of vehicles;
a plurality of generators, each similar to the generator;
a plurality of alarm devices, each similar to the alarm device;
each of said vehicles having a corresponding one of the generators and alarm devices.

15. The collision avoidance system of claim 6, wherein said generator is adapted to sense for the response signals from said alarm device after a predetermined time delay.

16. The safety system of claim 6, wherein said generator is adapted to be turned on and off to generate pulses of said magnetic field.

17. The safety system of claim 6, further comprising multiple generators, wherein said multiple generators generate oscillating magnetic fields sequentially and not at the same time.

18. The safety system of claim 6, wherein said magnetic field is adapted to operate at a low frequency of approximately 73 kHz.

19. The safety system of claim 6, further comprising multiple generators that generate oscillating magnetic fields in a random manner within selected periods of time.

20. The safety system of claim 19, wherein said alarm device senses strengths of magnetic fields from said multiple generators and differentiates between said strengths to determine whether values have been exceeded and to produce an alarm that gives priority to the higher levels of said sensed strengths.

21. The safety system of claim 6, wherein said alarm device is adapted to measure a strength of said magnetic field, and if the field strength exceeds a predetermined value, generates an alarm.

22. The collision avoidance system of claim 6, wherein a size of the magnetic field is modified by changing a width of a waveform input to a tuned circuit of the generator.

23. The system of claim 6, wherein the generator is configured to send a signal to shut down the vehicle upon sensing a response signal of a predetermined strength.

24. The system of claim 6, wherein the response during the first number of time portions indicates the alarm device is in a warning zone.

25. The system of claim 6, wherein the response during the second number of time portions indicates the alarm device is in a danger zone.

26. The system of claim 25, wherein the second number of time portions is all of the plurality of time portions.

* * * * *